Dec. 10, 1963   C. A. LANE ETAL   3,113,596
MANUFACTURE OF THERMIONIC VALVE GRIDS
Filed Jan. 13, 1959

INVENTORS
CLAYTON ARBUTHNOT LANE
REGINALD JOHN

BY  *Larson and Taylor*

3,113,596
MANUFACTURE OF THERMIONIC VALVE GRIDS
Clayton Arbuthnot Lane, Enfield, and Reginald John, Edmonton, London, England, assignors to Associated Electrical Industries (Woolrich) Limited, London, England, a British company
Filed Jan. 13, 1959, Ser. No. 786,530
Claims priority, application Great Britain Jan. 16, 1958
2 Claims. (Cl. 140—71.5)

This invention relates to the manufacture of grids for thermionic valves.

It has been the usual practice to produce a shaped grid for a thermionic valve by winding a grid wire around two spaced apart support wires between which a circular mandrel is positioned and then forming the grid around the mandrel by means of two shaped outer tools. By this method it has been found difficult to obtain a grid which is both accurately circular and in which the working part of the grid is accurately central with reference to the support wires.

It is an object of the present invention to provide a method of and apparatus for forming a grid accurately.

According to the present invention the method of forming a grid for a thermionic valve comprises placing a helically wound grid wire around two spaced apart support wires and a mandrel having fins extending between the two wires and then pressing a forming tool around the wound grid to make the grid wire follow the outline at least of the fins.

In another aspect of the present invention apparatus for forming a grid for a thermionic valve comprises a mandrel having fins extending radially outwards on respective opposite sides of the mandrel and two similar forming tools shaped so that on being applied to either side of the mandrel they close around the fins but have a clearance around the remainder of the mandrel.

In order that the invention may be more fully understood reference will now be made to the drawing accompanying this specification, in which.

Figure 3:
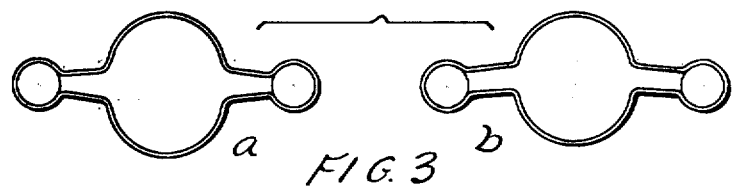
Figure 5:
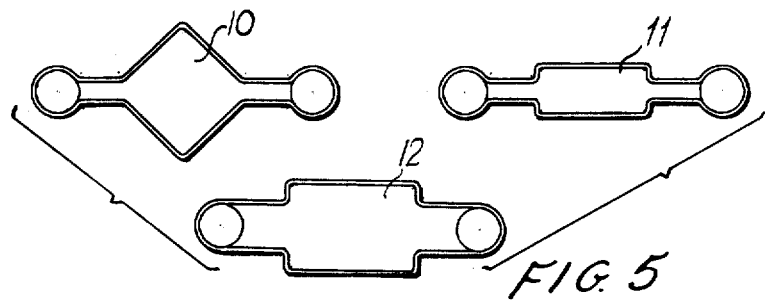
Figures 2, 4:
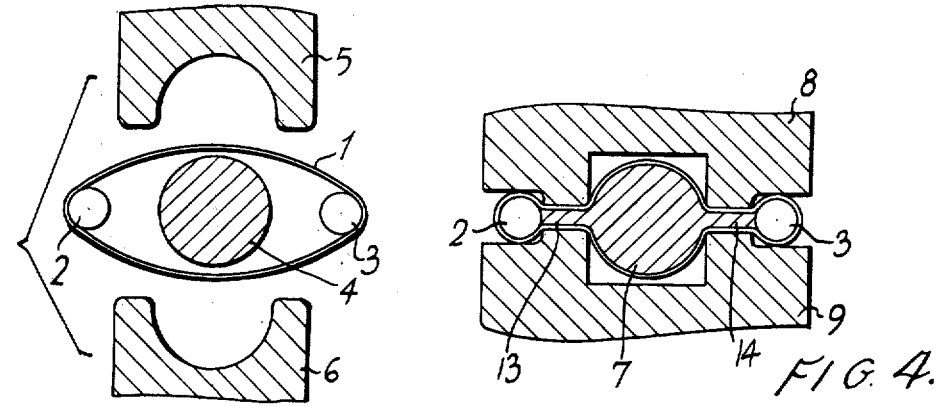
FIG. 2 shows how this shape is produced according to known practice.

FIGS. 3a and 3b respectively show inaccuracies produced by the known method;

FIG. 4 shows the manufacture of a grid in accordance with the present invention; and FIG. 5 shows alternative shapes of grids which can be produced.

Figure 1:
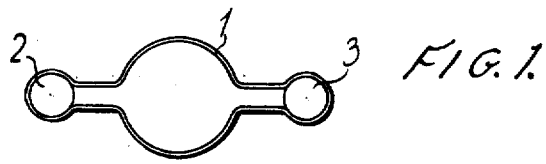
FIG. 1 shows the shape of the grid which it is desired to produce.

Referring to FIG. 1 it is desired to produce a wire grid 1 wound between two spaced apart support wires 2 and 3 and arranged so that the central working part of the grid is accurately dimensioned, for instance by being circular as shown in the figure. To produce this shape the grid wire 1 is placed fairly loosely around the two support wires 2 and 3 between which is positioned a circular mandrel 4 as shown in FIG. 2. To form the grid two outer tools 5 and 6 are then applied to either side of the mandrel to force the wires to take up the shape shown in FIG. 1. With such a method the grid may not always be accurately circular around the mandrel and may take up the shape shown in FIG. 3a. Another inaccuracy is that the centre of the grid is not coincident with the centre of the mandrel as shown in FIG. 3b.

In accordance with the present invention therefore a finned mandrel 7, as shown in FIG. 4 is used. The fins 13 and 14 of the mandrel extend between the two support wires 2 and 3. Two outer forming tools 8 and 9 are arranged to co-operate with this mandrel so that when applied to the wound grid they close around the fins and support wires and force the grid wires to follow the outline of the mandrel, the fins and the support wires. In addition tools 8 and 9 ensure that the mandrel is maintained centrally of the support wires. Adequate clearance is provided between the circular part of the mandrel and the forming tools to prevent flattening of the grid wire over the working section.

The finned mandrel also has the advantage of holding the support wires at predetermined fixed positions so that the wire grid can be stretched as it is formed, thus still further improving dimensional accuracy across the working section.

The invention not only applies to grids having circular working sections but may be applied to any shape of working section as for instance shown at 10, 11 and 12 in FIG. 5.

What we claim is:

1. A method of forming a grid for a thermionic valve comprising the steps of forming a wire into a helix, loosely placing the helically wound grid wire around two spaced apart support wires, inserting inside the grid between said two wires a mandrel having a shaped central region and a pair of fins extending radially outwards on opposite sides of said central region, said fins being in edge contact with and in a plane between the said support wires, and then applying pressure to the wound grid in the vicinity of the fins only, by means of two forming tools having clearance around said central region, to cause the grid wires to follow the outline of the fins and thereby be stretched over said central region.

2. The method of claim 1 wherein said grid wires are stretched beyond their elastic limit.

References Cited in the file of this patent

UNITED STATES PATENTS

| | | |
|---|---|---|
| 2,064,169 | Kershaw | Dec. 15, 1936 |
| 2,379,135 | Ekstedt et al. | June 26, 1945 |
| 2,429,062 | Johansen | Oct. 14, 1947 |
| 2,794,934 | Eisan | June 4, 1957 |
| 2,812,499 | Robertson | Nov. 5, 1957 |
| 2,880,496 | Benedict et al. | Apr. 7, 1959 |
| 2,989,019 | Van Sciver | June 20, 1961 |

UNITED STATES PATENT OFFICE
CERTIFICATE OF CORRECTION

Patent No. 3,113,596 December 10, 1963

Clayton Arbuthnot Lane et al.

It is hereby certified that error appears in the above numbered patent requiring correction and that the said Letters Patent should read as corrected below.

In the grant, lines 2 and 3, and 13, and in the heading to the printed specification, lines 4 and 5, name of assignee, for "Associated Electrical Industries (Woolrich) Limited", each occurrence, read -- Associated Electrical Industries (Woolwich) Limited --.

Signed and sealed this 5th day of May 1964.

(SEAL)
Attest:

ERNEST W. SWIDER

Attesting Officer

EDWARD J. BRENNER

Commissioner of Patents